UNITED STATES PATENT OFFICE.

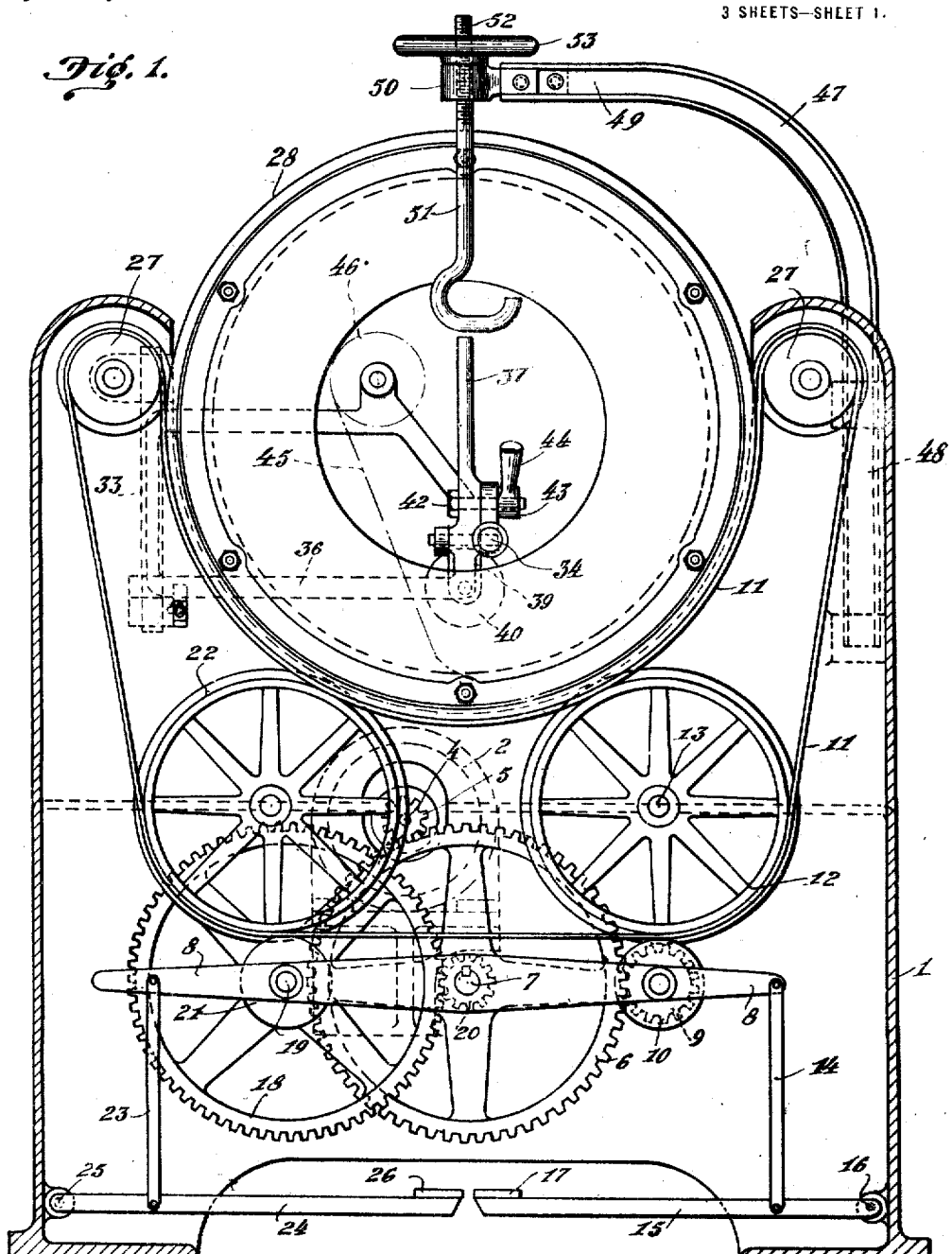

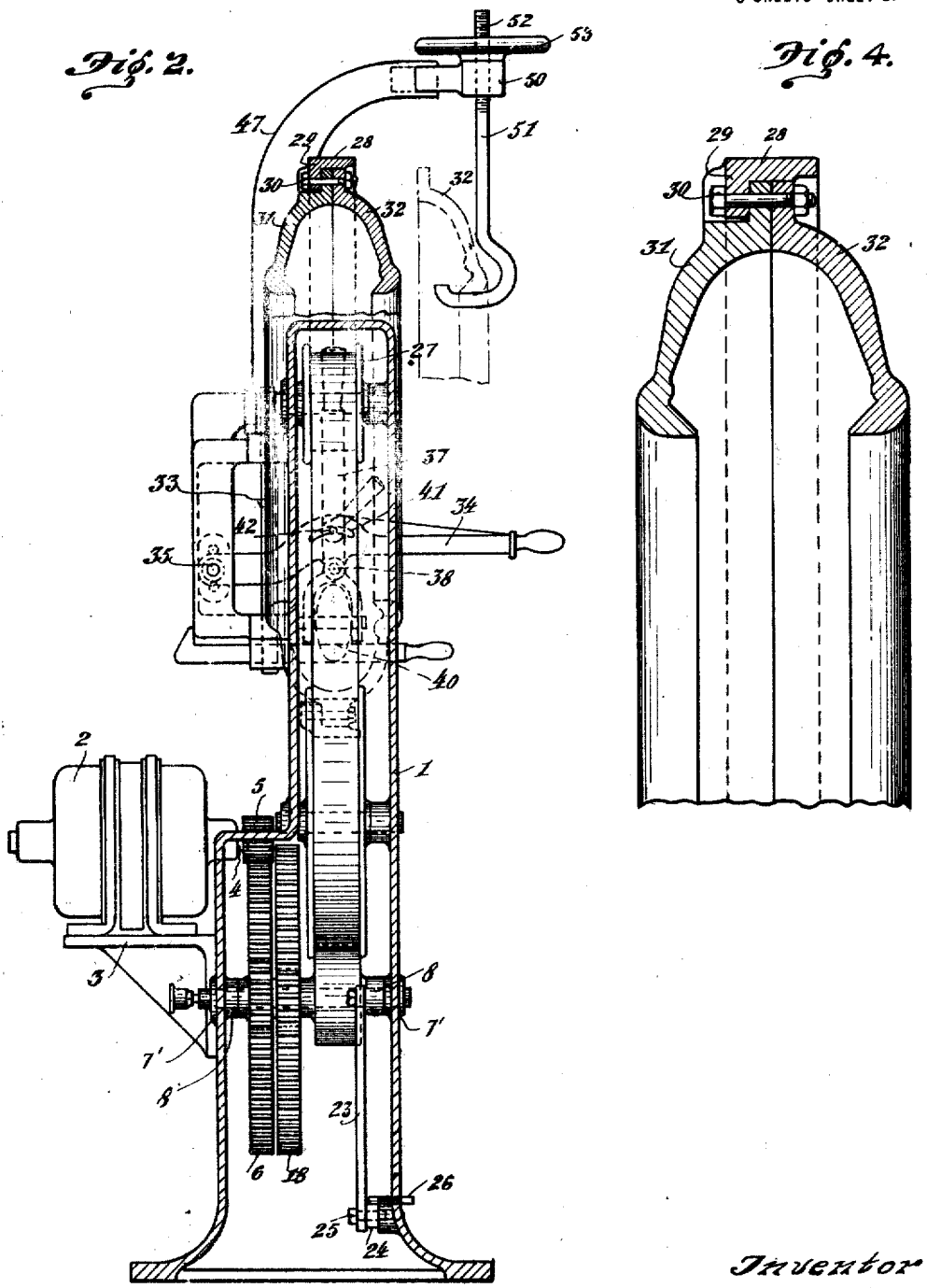

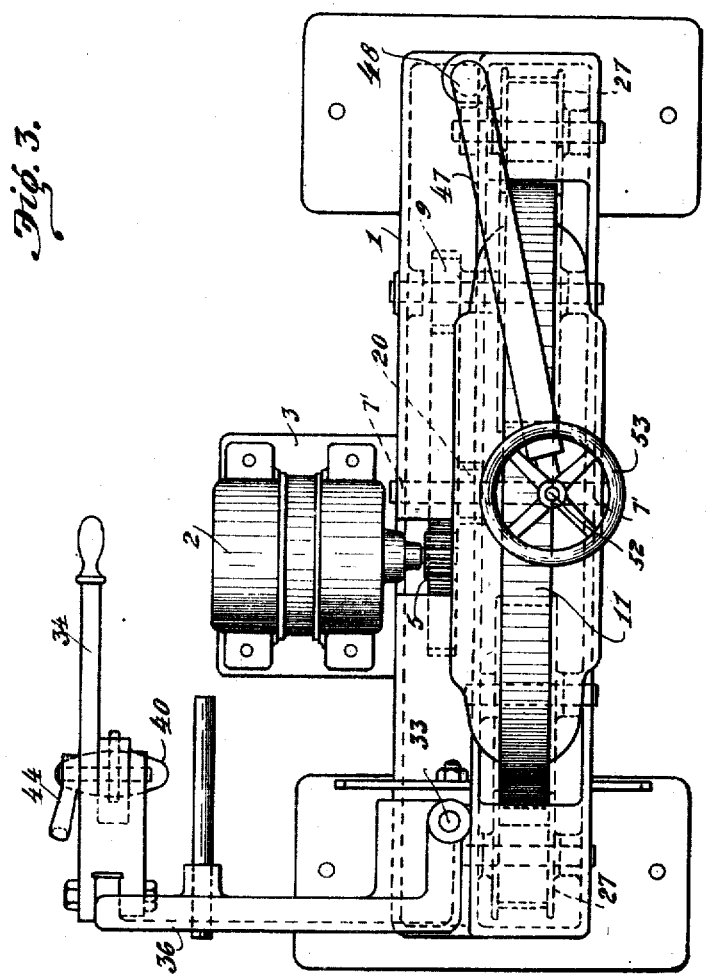

WILLIAM R. MAJOR, OF COSHOCTON, AND FRANK H. GROVE, OF COLUMBIANA, OHIO, ASSIGNORS TO THE BANNER MACHINE COMPANY, OF COLUMBIANA, OHIO, A CORPORATION OF OHIO.

MACHINE FOR BUILDING TIRE CASINGS AND TUBES.

1,343,399.  Specification of Letters Patent.  Patented June 15, 1920.

Application filed September 2, 1919. Serial No. 320,970.

*To all whom it may concern:*

Be it known that we, WILLIAM R. MAJOR and FRANK H. GROVE, both citizens of the United States, and residing at Coshocton, in the county of Coshocton and State of Ohio, and Columbiana, county of Columbiana, and State of Ohio, respectively, have invented a new and useful Machine for Building Tire Casings and Tubes, of which the following is a specification.

This invention relates to machines for forming the outer casings or inner tubes of pneumatic tires and more particularly to a machine provided with an open annular form within which the tire casing is built up.

The objects of the invention are to provide a tire casing and tube building machine provided with a rotatable annular channel shaped form within which the tire casing or tube is built; to construct the form of two separable annular portions detachably secured together and arranged to be separated after the tire is built to allow the removal of the same from the form; to provide a stitching device by means of which the material from which the casings are formed is properly stretched as it is placed within the annular form and to provide means for quickly forming the tire casing or tube.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a vertical section taken through a tire building machine embodying the invention;

Fig. 2 is a transverse section through the machine;

Fig. 3 is a plan view; and

Fig. 4 is a fragmentary sectional view on an enlarged scale of a portion of the annular form.

A practical embodiment of the invention is disclosed in the accompanying drawings, forming a part of this specification in which similar numerals of reference indicate corresponding parts throughout the several views.

The numeral 1 indicates generally the frame work which supports the machine, the lower part of said frame preferably comprising a housing within which the driving gearing is located. A motor 2 from which power is derived is mounted upon a suitable support 3 located upon the frame of the machine, the motor shaft 4 having mounted thereon a pinion 5 which meshes with the large gear 6 mounted upon a shaft 7 transversely located through the housing, and journaled in suitable bearings 7' provided in the housing. A lever 8 is pivoted upon the shaft 7 at substantially its center and near one end of said lever is mounted a pinion 9 meshing with the gear 6, a friction roller 10 being fixedly connected to said pinion and arranged to engage the endless belt 11 as it passes around the periphery of the grooved wheel 12, which wheel is mounted for rotation upon the transverse shaft 13 carried between the side members 1. A link 14 connects the extremity of the lever 8 adjacent the pinion 9 with a treadle 15 pivoted at 16 to the frame and provided with a foot portion 17.

A gear 18 is mounted upon a stub shaft 19 carried upon the other side of the lever 8, said gear meshing with the pinion 20 which is mounted upon the shaft 7. A friction roller 21, is fixedly connected to the gear 18 and is arranged to engage the endless belt 11 at a point where it passes around the periphery of the grooved wheel 22. A link 23 connects this end of the lever 8 with a treadle 24 pivoted at 25 to the frame 1 and provided with a foot portion 26.

The endless belt 11 passes upward upon each side around the grooved wheels 12 and 22 and over smaller grooved wheels and then downwardly around the under half of the annular ring 28 which ring is of proper diameter to rest upon the grooved wheels 12 and 22 and between the grooved wheels 27, the ring being thus supported in a vertical plane upon the endless belt 11 and between the flanges of the four grooved wheels.

The ring 28 is provided with an inwardly disposed flange 29 to which are attached, by means of spaced bolts 30, the two halves 31 and 32 of the open annular channel shaped form within which the tires are built up. This form is preferably of the cross sectional shape best shown in Fig. 4 of the drawings.

The stitching device is mounted upon a vertical spindle 33 and is arranged to be swung horizontally thereon. An operating lever 34, located in a substantially horizontal plane is pivoted at 35 to the frame of the stitching device indicated generally by the numeral 36, and a substantially vertical operating lever 37 is pivoted at 38 upon the lever 34 and carries the yoke 39 within which is mounted the stitching wheel 40. The lever 34 is provided with a curved slot 41 concentric with the pivotal point 38, and a bolt 42 is passed through the lever 37 and the slot 41 in the lever 34, a nut 43 provided with an operating handle 44 being located upon said bolt. By this construction the stitching wheel may be moved into any position required.

The fabric indicated by the numeral 45 is preferably carried upon a roll 46 mounted upon the upper portion of the stitching frame. The fabric is thus held in convenient position with reference to the stitching wheel to be unwound from the roll 46 and placed within the channel shaped form by the stitching wheel as the form is rotated.

A crane 47 is hingedly attached to the frame of the machine at 48. The upper end of this crane is bent into a substantially horizontal plane as shown at 49 and is provided with a head 50 having a suitable bore through which is suspended a hook 51, the upper screw threaded portion 52 of said hook being engaged by a wheel nut 53 by means of which the hook may be raised or lowered. This crane is designed to remove the section 32 of the form after a tire has been built in order that the tire may be removed from the form and to replace said section before the next tire is built within the form.

In operating the machine to build a tire casing within the channel shaped form the tread portion and side walls of the casing are first placed within the form after which the breaker strip is placed upon the tread or if desired the breaker strip may be applied to the tread before placing in the form. The form is preferably operated at a slow speed to build the tire and this is accomplished by depressing the treadle 15, rocking the lever 8 into position to move the friction roller 21 into frictional engagement with the belt, driving the belt at a slow speed and thus slowly rotating the form.

The fabric or cord is then placed within the form and the stitching wheel operated to press the fabric within the side walls and tread portion of the tire. The cushion strip may then be placed in the form and the inner plies of cord or fabric are then stitched upon the inner surface of that portion of the tire which has been built within the form.

If it is desired to operate the form at a comparatively fast rate of speed the treadle 26 is depressed, moving the friction roller 21 out of engagement with the belt 11 and throwing the friction roller 10 into engagement with the belt thus rotating the form at a comparatively high rate of speed.

These inner cords or fabric may be composed of any desired number of layers according to the size or type of tire to be built. The beads are then placed in their proper position and the remainder of the cord or fabric plies placed over the beads and stitched in place by means of the stitching wheel.

After the tire is thus built up the form is separated as above described and the tire removed therefrom and finished by vulcanization in the usual manner, preferably by placing upon an air bag or tube.

We claim:

1. A tire building machine comprising an annular channel shaped form within which the tire is built, means for revolving the form as the tire is built therein, and means for stitching the tire within said revoluble form.

2. A tire building machine including a revoluble open channel shaped form within which the tires are built and a stitching device arranged to operate within said form to stitch portions of the tire as it is built within the form.

3. A tire building machine including a revoluble channel shaped annular form separable around its periphery, and a stitching device arranged to operate within said annular form to stitch portions of the tire as it is built therein.

4. A tire building machine comprising an open annular revoluble form within which the tires are built, a stitching device mounted adjacent to said form, a stitching wheel upon said stitching device and means for moving said wheel vertically and horizontally to bring it into contact with all parts of the tire as it is built within the form.

5. A tire building machine comprising a revoluble channel shaped annular form within which the tires are built and a friction belt engaging the periphery of the form for revolving the same.

6. A tire building machine comprising an annular channel shaped form separable around its periphery, within which the tires are built, a revoluble ring within which the form is mounted, flanged wheels engaging the ring and a belt located around said wheels and engaging the periphery of the ring, for revolving the same.

7. A tire building machine including a revoluble channel shaped annular form within which the tires are built, a stitching device arranged to operate within the form and means for revolving the form at high speed or low speed.

In testimony that we claim the above, we have hereunto subscribed our names.

WILLIAM R. MAJOR.
FRANK H. GROVE.